3,133,060
ALKYLATION OF DERIVATIVES OF 3,4-DIHYDRO-1,2,4-BENZOTHIADIAZINE-1,1-DIOXIDE
Carl J. Buck, Gales Ferry, and James M. McManus, Uncasville, Conn., assignors to Chas. Pfizer & Co., Inc., New York, N.Y., a corporation of Delaware
No Drawing. Filed Feb. 1, 1961, Ser. No. 86,322
9 Claims. (Cl. 260—243)

This invention relates to a new and useful method for preparing various alkylated derivatives of several 2-unsubstituted benzothiadiazine compounds, which are known to be highly effective as therapeutic agents. More particularly, it is concerned with a method for preparing various 2-(lower alkyl) derivatives of several 3-(2,2,2-trifluoroethylthiomethyl)-6-substituted-7-sulfamyl - 3,4 - dihydro-1,2,4-benzothiadiazine - 1,1 - dioxides, which are known to be useful for their diuretic effects.

The products which the process of the present invention affords all possess the following general structural formula:

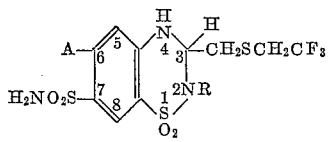

wherein A is a member selected from the group consisting of chlorine, bromine, trifluoromethyl, lower alkyl and lower alkoxy, and R is a member selected from the group consisting of methyl, ethyl and n-propyl. Among the typical members of this series is 2-methyl-3-(2,2,2-trifluoroethylthiomethyl)-6-chloro-7-sulfamyl - 3,4 - dihydro-1,2,4-benzothiadiazine-1,1-dioxide, which has been found to be a novel diuretic agent of extremely high potency with little or no unfavorable side effects.

In accordance with the prior art, a number of methods exclusive of the present one have been suggested for preparing these type compounds. Essentially, they all involve treating the appropriate 5-substituted-2,4-disulfamylaniline with 2,2,2 - trifluoroethylthioacetaldehyde. The aforementioned 5-substituted-2,4-disulfamylaniline compound is, in turn, prepared from the corresponding 2,4-disulfonyl chloride by reacting the latter type compound with a suitable amine. Unfortunately, this particular synthetic route possesses a number of disturbing drawbacks, among which are: relatively low yield of product, and the difficulty involved in purifying the product so obtained.

In accordance with the present invention, it has now been found possible to circumvent the aforementioned disadvantages of the prior art by means of a process which involves contacting a compound of the formula:

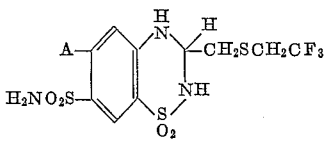

wherein A is as previously defined, with a straight-chain lower alkyl halide of the formula RX where R is a member selected from the group consisting of methyl, ethyl and n-propyl and X is a member chosen from the group consisting of bromine and iodine, in the presence of a basic condensing agent such as an alkali metal hydride, alkanolate or amide, or an alkali metal-alkyl or aryl compound. This reaction is carried out in an inert polar organic solvent and preferably one which is a member of the class of solvents known as the N,N-di(lower alkyl)-substituted derivatives of lower alkane hydrocarbon carboxamides. The advantages offered by the present process are manifold: for instance, (1) high yields (80%—95%) of the desired 2-(lower alkyl) substituted compound are consistently obtained in a straightforward manner with a minimum of time and effort; and (2) a high quality product is concurrently afforded, as ascertained by both qualitative and quantitative papergram analysis, i.e., the 2-(lower alkyl) derivative is obtained in an essentially pure state where contamination with unreacted starting material is of only minor significance and the presence of $N^2,N^7$-di(lower alkyl) substituted by-product in the final product can not be detected, except occasionally in trace amounts.

In connection with a more detailed consideration of the process of this invention, a 3-(2,2,2-trifluoro-ethylthiomethyl)-6-substituted-7-sulfamyl-3,4-dihydro - 1,2,4-benzothiadiazine-1,1-dioxide is reacted in a solvent of the foregoing type with a substantially equimolar amount of the lower alkyl halide, i.e., from about 0.8 to about 1.25 moles thereof, in the presence of the basic condensing agent at a temperature that is in the range of from about 5° C. up to about 35° C. for a period of from about fifteen minutes up to about two hours. In practice, the reaction is usually conducted at room temperature for a period of time that ordinarily is less than one-half hour. In this connection, it is to be understood that the use of temperatures which are above the upper limit of the aforestated range is to be avoided inasmuch as this would tend to cause unwanted contamination of the final product with the $N^2,N^7$-dialkylated by-product previously mentioned. Needless to say, in the case of the more volatile halides it may even be desirable to employ a closed system where the slightly elevated pressures present are more than sufficient to maintain the reagent in solution. As previously mentioned, the ideal solvents of choice for this process are the N,N-di(lower alkyl) derivatives of lower alkane hydrocarbon carboxamides such as N,N-dimethylformamide, N,N - diethylformamide, N,N - di(n-propyl)-formamide, N,N - dimethylacetamide, N,N - diethylacetamide, N,N-dimethylpropionamide, and the like. The lower alkyl halide employed as the alkylating agent is one which contains from one to three carbon atoms in a straight chain as previously indicated and preferably one which is chosen from the group consisting of straight-chain lower alkyl bromides and iodides, although any such lower alkyl halide wherein the atomic number of the halogen moiety is in the range of 17–53, inclusive, is most satisfactory for these purposes provided that the less reactive members of this series are aided by the addition of an accelerating agent such as potassium iodide or sodium bromide. Typical examples of such lower alkyl halides include methyl iodide, ethyl bromide, n-propyl iodide, and the like, as well as the corresponding chlorides if the latter can be made to regenerate the desired halides in situ by the use of the aforementioned type reagents, e.g., calcium iodide in a sealed tube [v. Romburgh, Recueil des travaux chimiques des Pays-Bas, vol. 1, p. 151 (1883)], potassium iodide in methanol [Finkelstein, Chemische Berichte, vol. 43, p. 1528 (1910)]. The basic condensing agents employed in order to effect this particular reaction are all selected from the class of alkali metal bases previously enumerated which are strong enough to form salts with the weakly acidic 2-unsubstituted 3,4-dihydro - 1,2,4 - benzothiadiazine - 1,1 - dioxide compounds and yet mild enough not to degrade the organic molecule under the conditions of the reaction. Such basic condensing agents definitely include sodium hydride, lithium hydride, potassium hydride, sodium and potassium lower alkanolates like sodium methylate and potassium tert.-butoxide, sodamide, lithium amide, potassium amide, and so forth.

A variation in the procedure with respect to the process of this invention involves starting wtih the appropriate 2-alkali metallo salt of the corresponding 3-(2,2,2-trifluoroethylthiomethyl)-6-substituted-7-sulfamyl - 3,4 - dihydro-1,2,4-benzothiadiazine-1,1-dioxide compound and then alkylating with a lower alkyl halide as hereinbefore described in the absence of the basic condensing agent. However, this variation is actually one of manipulation rather than chemistry inasmuch as the alkali metal salt employed is actually first formed in situ during the course of the over-all process previously discussed. Nevertheless, the so-called alternate route may prove to be more facile and convenient at times, especially if the desired starting materials are readily at hand.

The valuable products produced by either of these two methods, i.e., by the process of the present invention, are readily recovered from the reaction mixture (which is essentially the same in either case) by the use of any number of standard techniques well-known to those having skill in the art to which this type subject matter pertains. For instance, the reaction mixture may be poured into water whereby the desired $N^2$-monoalkylated product readily crystallizes out or precipitates from said solution. Further purification may then be achieved, if so desired, by means of recrystallization from a suitable solvent system such as acetone-toluene, methyl ethyl ketone-benzene, methanol-water, methylene chloride, and so on.

The starting materials required for carrying out this invention may be prepared by any number of conventional synthetic routes well-known to those in the field of organic chemistry. For example, the 3-(2,2,2-trifluoroethylthiomethyl)-6-substituted-7-sulfamyl - 3,4 - dihydro-1,2,4-benzothiadiazine-1,1-dioxide starting material is prepared from the corresponding 2,4-disulfamyl-5-substituted-aniline by reacting the latter type compound with a substantially equimolar amount of 2,2,2,-trifluoroethylthio-acetaldehyde or an acetal thereof in an inert organic solvent like 1,2-dimethoxyethane or N,N-dimethylacetamide at a temperature of from about 60° C. to about 120° C. for a period of about one-half to about five hours in the presence of a catalytic amount of mineral acid. The aforementioned 2,4-disulfamyl-5-substituted-aniline compound is, in turn, readily prepared from the corresponding meta-substituted aniline in accordance with the general procedures set forth in Monatsch. Chem., vol. 48, p. 87 (1927), for the preparation of disulfonyl chlorides. Conversion of the latter type compounds to the corresponding disulfonamides is, of course, easily achieved by treatment with concentrated ammonium hydroxide or a suitable amine in the standard manner. Finally, the aldehyde reagent mentioned previously is prepared from mercaptoacetaldehyde dimethylacetal and trifluorethyl iodide (both of which are readily synthesized) in a simple metathetical reaction, which is best effected via an alkali metal alkoxide in a lower alkanol solvent medium at room temperature.

As previously indicated, the products afforded by the process of this invention are all highly potent diuretic agents. Moreover, they accomplish their beneficial therapeutic effects without causing an unfavorable balance in the electrolyte excretion pattern to occur. On the contrary, it has been found that these particular compounds all bring about an increase in natriuresis and chloruresis without causing any concomitant decrease in the amount of potassium normally present in the body. More specifically, 2-methyl-3 - (2,2,2 - trifluoroethylthiomethyl)-6-chloro - 7 - sulfamyl - 3,4-dihydro-1,2,4-benzothiadiazine-1,1-dioxide has been shown to be nine times more potent than benzthiazide in chloruresis and six times more potent in natriuresis when tested in dogs for this particular purpose. At the same time, no significant decrease in body potassium could be observed.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

To a well-stirred solution consisting of 4.3 g. (0.01 mole) of 3-(2,2,2-trifluoroethylthiomethyl)-6-chloro-7-sulfamyl-3,4-dihydro-1,2,4-benzothiadiazine - 1,1 - dioxide dissolved in 35 ml. of dry N,N-dimethylformamide there was added 0.46 g. of sodium hydride in the form of a 53% suspension in oil (0.01 mole). An immediate foaming took place due to the evolution of hydrogen, and the temperature rose to about 40° C. After stirring for an additional 15 minutes at room temperature, solution of the hydride was complete. A solution consisting of 1.42 g. (0.01 mole) of methyl iodide dissolved in 10 ml. of dry N,N-dimethylformamide was then added dropwise to the reaction mixture during the course of a twenty-minute period with constant agitation being maintained throughout this step. Upon completion of this step, the resultant mixture was stirred for an additional hour at room temperature and then added rapidly to 400 ml. of water at a fast dropwise rate with vigorous stirring. The white solid which formed was collected after one hour, washed well with water and dried in vacuo at 80° C. for approximately 16 hours. In this manner, there was obtained a 3.5 g. (80%) yield of 2-methyl-3-(2,2,2-trifluoroethylthiomethyl)-6-chloro-7-sulfamyl-3,4 - dihydro - 1,2,4 - benzothiadiazine-1,1-dioxide, M.P. 199–204° C. After one recrystallization from acetone-toluene, the melting point was raised to 207–208° C. On admixture with an authentic sample, no depression in the melting point could be observed. A paper chromatographic analysis of the product showed a purity of about 90%, with only trace amounts of starting material as being present.

*Example II*

The procedure of Example I was repeated employing a 0.1 molar scale of starting materials. In this particular case, there was obtained a 91% yield of 2-methyl-3-(2,2,2-trifluoroethylthiomethyl) - 6 - chloro - 7 - sulfamyl-3,4-dihydro-1,2,4-benzothiadiazine-1,1-dioxide on direct precipitation from the water solution. This material was 95% pure as revealed by papergram analysis and showed only a trace of starting material as being present.

*Example III*

The procedure of Example I was repeated on a 0.02 molar scale, employing 70 ml. of dry N,N-dimethylacetamide in place of the N,N-dimethylformamide. In this case, there was obtained an 88% yield of 2-methyl-3-(2,2,2 - trifluoroethylthiomethyl)-6-chloro - 7 - sulfamyl-3,4-dihydro-1,2,4-benzothiadiazine-1,1-dioxide, M.P. 199–203° C. This material was 97% pure as revealed by quantitative papergram analysis.

*Example IV*

The procedure of Example III was repeated except that a 10% excess of one molar equivalent each of the methyl iodide and the sodium hydride was employed. In this case, there was obtained a 99% yield of 2-methyl-3-(2,2,2-trifluoroethylthiomethyl)-6-chloro-7-sulfamyl - 3,4-dihydro-1,2,4-benzothiadiazine-1,1 - dioxide, M.P. 195–201° C. The product showed a single spot on a qualitative paper chromatogram.

*Example V*

The procedure of Example IV was repeated except that sodium methoxide (powdered) was employed in place of the sodium hydride. In this particular case, there was obtained an 88% yield of 2-methyl-3-(2,2,2,-trifluoroethylthiomethyl)-6-chloro-7-sulfamyl-3,4-dihydro - 1,2,4 - benzothiadiazine-1,1-dioxide, which was identical in every respect with the product of Example IV.

*Example VI*

The procedure of Example V was repeated on a 0.1 molar scale to afford a 90% yield of 2-methyl-3-(2,2,2-trifluoroethylthiomethyl)-6-chloro-7-sulfamyl - 3,4 - dihydro-1,2,4-benzothiadiazine-1,1-dioxide.

*Example VII*

The procedure described in Example I is followed employing other 3-(2,2,2-trifluoroethylthiomethyl)-6-substituted-7-sulfamyl-3,4-dihydro-1,2,4-benzothiadiazine - 1,1-dioxides as starting materials in place of the corresponding 6-chloro compound. For the sake of convenience and in order to avoid unnecesary repetition of experimental detail, the following list of such compounds is presented below. In each and every case, the corresponding 2-methyl compound is obtained in yield ranging in substantially the same order of magnitude as that reported for the product of Example I.

3-(2,2,2-trifluoroethylthiomethyl)-6-bromo-7-sulfamyl-3,4-dihydro-1,2,4-benzothiadiazine-1,1,-dioxide
3-(2,2,2-trifluoroethylthiomethyl)-6-methyl-7-sulfamyl-3,4-dihydro-1,2,4-benzothiadiazine-1,1,-dioxide
3-(2,2,2-trifluoroethylthiomethyl)-6-(n-propyl)-7-sulfamyl-3,4-dihydro-1,2,4-benzothiadiazine-1,1-dioxide
3-(2,2,2-trifluoroethylthiomethyl)-6-ethoxy-7-sulfamyl-3,4-dihydro-1,2,4-benzothiadiazine-1,1,-dioxide
3-(2,2,2-trifluoroethylthiomethyl)-6-isopropoxy-7-sulfamyl-3,4-dihydro-1,2,4-benzothiadiazine-1,1-dioxide
3-(2,2,2-trifluoroethylthiomethyl)-6-trifluoromethyl-7-sulfamyl-3,4-dihydro-1,2,4-benzothiadiazine-1,1-dioxide

*Example VIII*

To a well-stirred solution consisting of 4.25 g. (0.01 mole) of 3-(2,2,2-trifluoroethylthiomethyl)-6-chloro-7-sulfamyl - 3,4 - dihydro-1,2,4-benzothiadiazine-1,1-dioxide and 0.65 g. (0.012 mole) of sodium methoxide dissolved in 10 ml. of N,N-dimethylformamide there was added dropwise during the course of a twenty-minute period 1.48 g. (0.012 mole) of n-propyl bromide (1-bromopropane) dissolved in 5 ml. of anhydrous N,N-dimethylformamide. Upon completion of this step, the resultant reaction mixture was stirred at room temperature for an additional five and one-half hours and then added ragidly to 400 ml. of ice-water at a fast dropwise rate with vigorous agitation being maintained throughout said addition. The white solid precipitate which formed at this point was then collected by means of suction filtration, washed well with cold water and subsequently dried in vacuo over $P_2O_5$ at 25° C. for approximately sixteen hours. In this manner, there was then obtained a 3.5 g. (75%) yield of 2 - (n-propyl)-3-(2,2,2-trifluoroethylthiomethyl)-6-chloro - 7-sulfamyl-3,4-dihydro-1,2,4-benzothiadiazine-1,1-dioxide, which after recrystallization from methylene chloride melted at 184–185° C. On admixture of this material with that of an authentic sample, no depression in the melting point could be observed.

*Example IX*

The procedure described in Example VIII was repeated employing 1.71 g. (0.011 mole) of ethyl iodide in place of the n-propyl bromide and keeping the sodium methoxide concentration level at 0.61 g. (0.011 mole of sodium methoxide). In this way, there was obtained a 3.6 g. (80%) yield of 2-ethyl-3-(2,2,2-trifluoroethylthiomethyl)-6 - chloro - 7-sulfamyl-3,4-dihydro-1,2,4-benzothiadiazine-1,1-dioxide, which after recrystallization from methylene chloride melted at 186–188° C. As in the previous example, no depression in the melting point could be observed upon admixture of this material with that of an authentic sample.

*Example X*

The procedure of Example I is repeated using either lithium hydride, sodamide or potassium tert.-butoxide as the basic condensing agent in place of sodium hydride with comparable results being obtained in each and every case.

*Example XI*

The procedure of Example I is followed except that the N,N-dimethylformamide solution of methyl iodide is added to a well-stirred solution of the preformed sodium salt, i.e., 2-sodio-3-(2,2,2-trifluoroethylthiomethyl)-6-chloro - 7 - sulfamyl - 3,4 - dihydro-1,2,4-benzothiadiazine-1,1-dioxide, which is present in 35 ml. of the same solvent at the 4.52 g. (0.01 mole) concentration level. In this particular case, the product of Example I is obtained in substantially the same yield.

In like manner, the use of the corresponding lithium and potassium salts, viz., 2-lithio-3-(2,2,2-trifluoroethylthiomethyl) - 6 - chloro-7-sulfamyl-3,4-dihydro-1,2,4-benzothiadiazine-1,1-dioxide and 2-potassio-3(2,2,2-trifluoroethylthiometyl) - 6 - chloro-7-sulfamyl-3,4-dihydro-1,2,4-benzothiadiazine-1,1-dioxide, respectively, in place of the above employed sodium salt affords comparable results in each instance.

What is claimed is:

1. A process for preparing a compound of the formula:

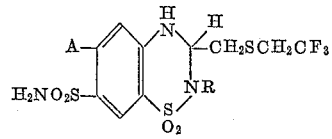

wherein A is a member selected from the group consisting of chlorine, bromine, trifluoromethyl, lower alkyl and lower alkoxy, and R is a member selected from the group consisting of methyl, ethyl and n-propyl, which comprises reacting a compound of the aforesaid formula where R is hydrogen in a N,N-di(lower alkyl) lower alkane hydrocarbon carboxamide solvent with a substantially equimolar amount of a straight-chain lower alkyl halide of the formula RX where R is a member selected from the group consisting of methyl, ethyl and n-propyl and X is a member chosen from the group consisting of bromine and iodine, in the presence of a basic condensing agent selected from the group consisting of an alkali metal hydride, an alkali metal lower alkanolate and an alkali metal amide at a temperature that is in the range of from about 5° C. up to about 35° C.

2. A process as claimed in claim 1 wherein equimolar amounts of reactants are employed, the solvent is N,N-dimethylformamide and the basic condensing agent is sodium hydride.

3. A process as claimed in claim 2 wherein the solvent is N,N-dimethylacetamide.

4. A process as claimed in claim 1 wherein a 10% excess of one molar equivalent each of the lower alkyl halide alkylating agent and the basic condensing agent is employed.

5. A process as claimed in claim 4 wherein the alkylating agent is methyl iodide and the basic condensing agent is sodium hydride.

6. A process as claimed in claim 5 wherein the basic condensing agent is sodium methoxide.

7. In the process for preparing a compound of the formula:

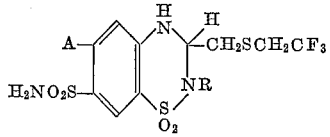

wherein A is a member selected from the group consisting of chlorine, bromine, trifluoromethyl, lower alkyl and lower alkoxy, and R is a member selected from the group consisting of methyl, ethyl and n-propyl, from the corresponding compound where R is hydrogen, the step which comprises reacting a 2-alkali metallo salt of said unsubstituted compound in a N,N-di(lower alkyl) lower alkane hydrocarbon carboxamide solvent with a substantially equimolar amount of a straight-chain lower alkyl halide alkylating agent of the formula RX where R is a member selected from the group consisting of methyl, ethyl and n-propyl and X is a member chosen from the group consisting of bromine and iodine at a temperature that is in the range of from about 5° C. up to about 35° C.

8. The process claimed in claim 7 wherein 2-sodio-3-(2,2,2 - trifluoroethylthiomethyl)-6-chloro-7-sulfamyl-3,4-dihydro-1,2,4-benzothiadiazine-1,1-dioxide is the starting material employed.

9. The process as claimed in claim 7 wherein 2-lithio-3-(2,2,2 - trifluoroethylthiomethyl)-6-chloro-7-sulfamyl-3,4-dihydro-1,2,4-benzothiadiazine-1,1-dioxide is the starting material employed.

References Cited in the file of this patent

UNITED STATES PATENTS 2,687,414   Cusic _____ Nov. 26, 1948

OTHER REFERENCES

Wagner et al.: Synthetic Organic Chemistry, pages 666–669 (1953).

Whitmore: Organic Chemistry, pages 170–175 (1951), second edition.